United States Patent [19]

Alfieri et al.

[11] Patent Number: 6,078,657
[45] Date of Patent: Jun. 20, 2000

[54] METHOD AND SYSTEM FOR PROVIDING LOCAL TELEPHONE NUMBER PORTABILITY USING GEOGRAPHIC UNIT BUILDING BLOCKS

[75] Inventors: James Daniel Alfieri, Hamilton, N.J.; William Henry Krall, III, Yardley, Pa.

[73] Assignee: Telcordia Technologies, Inc., Morristown, N.J.

[21] Appl. No.: 08/866,914

[22] Filed: May 30, 1997

Related U.S. Application Data

[60] Provisional application No. 60/018,765, May 31, 1996.

[51] Int. Cl.$^7$ .................................................. H04M 3/42
[52] U.S. Cl. ................................. 379/220; 379/207
[58] Field of Search ........................... 379/207, 211, 379/212, 219, 220, 221, 229, 230, 201

[56] References Cited

U.S. PATENT DOCUMENTS

| | | | |
|---|---|---|---|
| 4,757,267 | 7/1988 | Riskin | 379/113 |
| 5,095,505 | 3/1992 | Finucane et al. | 379/201 |
| 5,136,636 | 8/1992 | Wegrzynowicz | 379/207 |
| 5,163,087 | 11/1992 | Kaplan | 379/142 |
| 5,506,897 | 4/1996 | Moore et al. | 379/220 |
| 5,533,107 | 7/1996 | Irwin et al. | 379/201 |
| 5,588,048 | 12/1996 | Neville | 379/127 |
| 5,661,792 | 8/1997 | Akinpelu et al. | 379/221 |
| 5,740,239 | 4/1998 | Bhagat et al. | 379/243 |
| 5,764,745 | 6/1998 | Chan et al. | 379/207 |
| 5,771,284 | 6/1998 | Sonnenberg | 379/220 |
| 5,793,857 | 8/1998 | Barnes et al. | 379/207 |
| 5,805,689 | 9/1998 | Neville | 379/220 |
| 5,867,569 | 2/1999 | Martinez et al. | 379/207 |
| 5,883,950 | 3/1999 | Sonnenberg | 379/220 |
| 5,940,490 | 8/1999 | Foster et al. | 379/220 |

*Primary Examiner*—Scott Wolinsky
*Attorney, Agent, or Firm*—Joseph Giordano

[57] ABSTRACT

A method and system for providing local number portability using a concept known as Geographic Unit Building Blocks (GUBB). Service providers (carriers) accept and use a map that divides a geographic area, such as a State, into sub-area GUBBs. The carriers operating within the State jurisdiction would then assign GUBBs to the telephone numbers they serve which accurately reflect each telephone number's geographic location on the State map. All ported numbers will have an explicit GUBB assignment as part of the location routing number (LRN) which would then be stored in the Local Number Portability (LNP) database used to provide translations for routing the call.

9 Claims, 4 Drawing Sheets

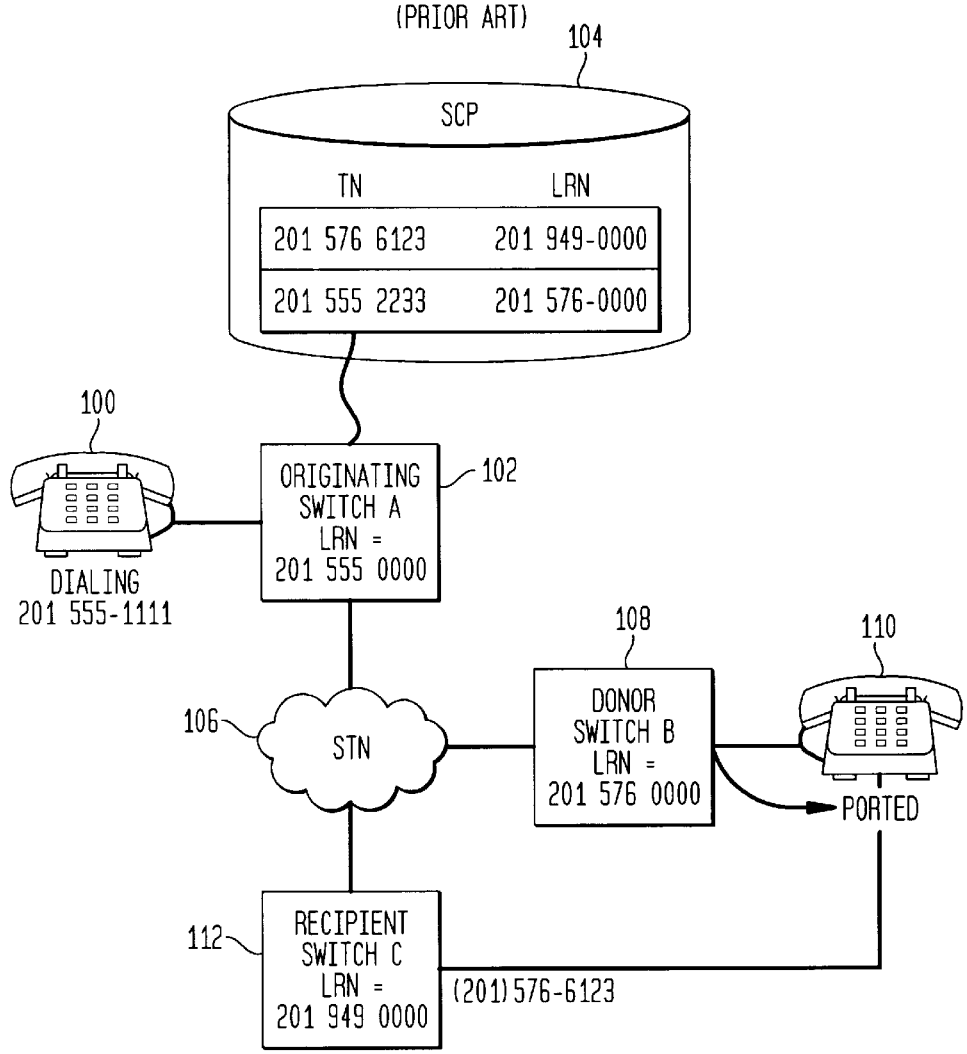

TABLE 1

| NPA-NXX | NATIVE SWITCH | 10-DIGIT ROUTING ASSIGNMENTS [FOR INTERNAL ROUTING TABLES] |
|---|---|---|
| 307 234 | 304 | 307 234-0005 |
| 307 295 | 304 | 307 295-0006 |
| 307 667 | 305 | 307 667-0007 |
| 307 758 | 300 | 307 758-0001 |
| 307 888 | 300 | 307 888-0001 |
| 307 964 | 303 | 307 964-0011 |

TABLE 2

| PORTED TELEPHONE NUMBERS | LRN-GUBB |
|---|---|
| 307 234-4444 | 307 888-0004 |
| 307 435-7809 | 307 888-0002 |
| 307 667-1991 | 307 777-0002 |
| 307 964-3456 | 307 888-0003 |

| SQUARENET ⊠ SWITCH A-RC-1 | | | |
|---|---|---|---|
| INTRA NETWORK/ INTRA RATE CENTER | INTER NETWORK/ INTRA RATE CENTER | INTER RATE CENTER/ TOLL [2PIC] | INTER RATE CENTER/ TOLL [1PIC] |
| TYPE OF CALL 1 | TYPE OF CALL 2 | TYPE OF CALL 3 | TYPE OF CALL 4 |
| 307 758-0001<br>307 888-0001<br>307 888-0003<br>307 888-0004 | 307 777-0004 | 307 777-0002<br>307 888-0002 | DEFAULT TO 1PIC |

602

| STARNET ✻ SWITCH Q-RC-1 | | | |
|---|---|---|---|
| INTRA NETWORK/ INTRA RATE CENTER | INTER NETWORK/ INTRA RATE CENTER | INTER RATE CENTER/ TOLL [2PIC] | INTER RATE CENTER/ TOLL [1PIC] |
| TYPE OF CALL 1 | TYPE OF CALL 2 | TYPE OF CALL 3 | TYPE OF CALL 4 |
| 307 777-0002<br>307 777-0004 | 307 888-0002<br>307 888-0004 | 307 758-0001<br>307 888-0001<br>307 888-0003 | DEFAULT TO 1PIC |

603

| SQUARENET ⊠ SWITCH A-RC-2 | | | |
|---|---|---|---|
| INTRA NETWORK/ INTRA RATE CENTER | INTER NETWORK/ INTRA RATE CENTER | INTER RATE CENTER/ TOLL [2PIC] | INTER RATE CENTER/ TOLL [1PIC] |
| TYPE OF CALL 1 | TYPE OF CALL 2 | TYPE OF CALL 3 | TYPE OF CALL 4 |
| 307 888-0002 | 307 777-0002 | 307 758-0001<br>307 777-0004<br>307 888-0001<br>307 888-0003<br>307 888-0004 | DEFAULT TO 1PIC |

METHOD AND SYSTEM FOR PROVIDING LOCAL TELEPHONE NUMBER PORTABILITY USING GEOGRAPHIC UNIT BUILDING BLOCKS

CROSS-REFERENCE TO RELATED APPLICATIONS

This application relates to U.S. Provisional Patent Application Ser. No. 60/018,765, filed on May 31, 1996 which is incorporated herein by reference.

FIELD OF THE INVENTION

The present invention relates to the field of telephony technology. In particular, the present invention relates the field of telephone system architecture and the methods and processes for the inter-operation among telephone network elements to accomplish local telephone number portability.

BACKGROUND OF THE INVENTION

Currently, local telephone service is provided by a single company, such as a Regional Bell Operating Company (RBOC). These companies basically enjoy a monopoly over local telephone service within their regions. Thus, efforts are being made to introduce competition into the local telephone market to eliminate the monopolies. Under the current system, however, if customers want to change from one service provider to another, they must also change their telephone numbers. This inhibits telephone customers' willingness to switch to an alternate service provider.

To allevoate the problem, the Federal Communications Commission (FCC) has issued an order for Number Portability (NP) which, in addition to providing other features, will allow a customer to switch between local service providers while keeping the same telephone number. In the first phase of NP, known as Local Service Provider Portability, the customer's geographic location does not change. In the second phase of NP, known as Portability Outside the Rate Center, the customer will have the option to change geographic locations and retain their telephone number.

The public telephone network consists of a large number of switches, such as Lucent Technologies' No. 5ESS, each serving about 10 k to 100 k customers. When a customer dials a number, the customer's serving switch (the originating switch) must allocate a route to the switch serving the dialed number (the destination/provider switch). In the existing telephone network, the first six digits (NPA-NXX) of a 10 digit telephone number identify a particular switch in a particular geographic region. Switches can route calls between switches based on the NPA-NXX of the dialed number. With Local Service Provider Number Portability, the NPA-NXX of the dialed number unambiguously identifies the geographic location of the customer.

Current proposals for the first phase of NP involve storing an identifier corresponding to the switch (the Location Routing Number or LRN) to which a subscriber's service has been ported in a large, special purpose computers, known as service control points (SCP). The chosen implementation for NP in most jurisdictions is for the switch originating a call to query the SCP for an LRN. routing address on every in switch call to a portable NPA-NXX. (A portable NPA-NXX is one in which at least one number has ported from one service provider to another.) The LRN is used to address the switch (the Recipient Switch) to which the call should terminate. Although the LRN is a 10-digit number, the switch uses only the first 6-digits, i.e., NPA-NXX of the LRN, to route the call. The call is routed on these 6-digits of the LRN as though the switch were acting on the NPA-NXX of dialed telephone number. The same routing tables are used because the portability of the customer is restricted to the boundaries of the established rate centers, i.e., there is no location portability outside these rate centers. As a result of this restriction to portability within the rate centers, call typing, carrier selection, distance rating, and generation of billing information can be determined accurately by using the dialed telephone number without any additional information. Although the customer has been ported from one service provider to another, the geographic relationship between the dialed NPA-NXX and the defined geographic location of the called customer is unbroken.

With Portability Outside the Rate Center, however, this relationship between the NPA-NXX and the geographic location of a customer is broken, such that there is no fixed relationship between the dialed telephone number and its geographic location.

Separating the relationship between a telephone number and its geographic location has an impact on other aspects of the telephone network which are necessary for providing telephone service. As an example telephone service pricing and billing are dependant on the relationship between the telephone number and the geographic location of the subscriber. Carrier selection during call processing is also dependent on this relationship.

The impact on telephone service pricing is as follows. If it is assumed that distance sensitivity will remain as one of the two major factors (along with call duration) in the pricing of a telephone call, then it follows that a geographic location must continue to be associated with both the Calling Number and Called Number for telephony services. As generally defined by the FCC and other regulatory bodies, the distance of a telephone call is the airline mileage between the calling party and the called party as measured using geographic coordinates assigned to the "Rate Centers" in which the Calling Party and Called Party are located. Today, with limited exceptions, the same Rate Center is used for every line number of an NPA-NXX. If a telephone number is ported outside its geographic area in which its NPA-NXX is defined, then some designation for the geographic location must be found.

The NPA-NXX today is not only used for "toll" rating between rate centers, but also to define boundaries for various types of Local Service, such as Local Measured Service, Message Unit Service and other variations on the theme of usage sensitive measurements for local service. Switching systems are programmed via translations to route and rate telephone calls based on table relationships between the Calling Party Number and Called Party Number and other factors such as the Calling Party Class of Service. Removing the geographic significance of the NPA-NXX putt the on-going viability of these translation tables, and thus the services that they define and enable, in jeopardy of no longer being able to work at all.

It is also critical to note that geographic boundaries implied by the NPA-NXX play a central role in carrier selection, in that the rules used today to separate the realms of competition (i.e. Local Exchange Service, Intrastate Toll, Interstate Toll) are based on the relationship of the Calling Party NPA-NXX to the Called Party NPA-NXX. The NPA-NXX relationship between the Calling and Called Parties is the key component in the logic of the switching system used to determine to which transport carrier the call must be handed off for delivery to the Called Party.

Accordingly, it is an object of our invention to provide a method and system for providing local number portability that overcome the restrictions of the prior art and enables continued use of existing systems and structures which are based on the relationship of the telephone number to the rated center from which the users service is provided.

SUMMARY OF THE INVENTION

To achieve th is and other objectives and advantages in accordance with the purposes of the invention, as embodied and broadly described, our invention is a method and system for providing local number portability using a concept we describe as a "Geographic Unit Building Block" (GUBB).

Our invention requires that the service providers (carriers) accept and use a map that divide a geographic area, such as a State, into sub-areas to be known as GUBBs. The carriers operating within the State jurisdiction would then assign GUBBs to the telephone numbers they serve which accurately reflect each telephone number's geographic location on the State map. All ported numbers will have an explicit GUBB assignment as part of the location routing number (LRN) which would then be stored in the Local Number Portability (LNP) database used to provide translations for routing the call. NP compatible telephone switches and SCP's would include functionality that permitted the querying of the LNP database, whether resident at an SCP or in the switch, for a translation of the dialed number into the LRN which would include as an element a GUBB designation. The originating switch would route the call in accordance with the LRN and use the GUBB designation for billing, carrier selection or any other processes that are dependant on geographic location.

BRIEF DESCRIPTION OF THE DRAWING

The present invention will be described with reference to the accompanying drawing of which:

FIG. 1 is a block diagram that depicts a typical prior art telephone network which has implemented local number portability.

FIG. 2 illustrates the concept of Geographic Unit Building Blocks.

FIG. 6 depicts exemplary routing tables for the service providers depicted in FIG. 5.

DESCRIPTION OF THE INVENTION

Figure 3:
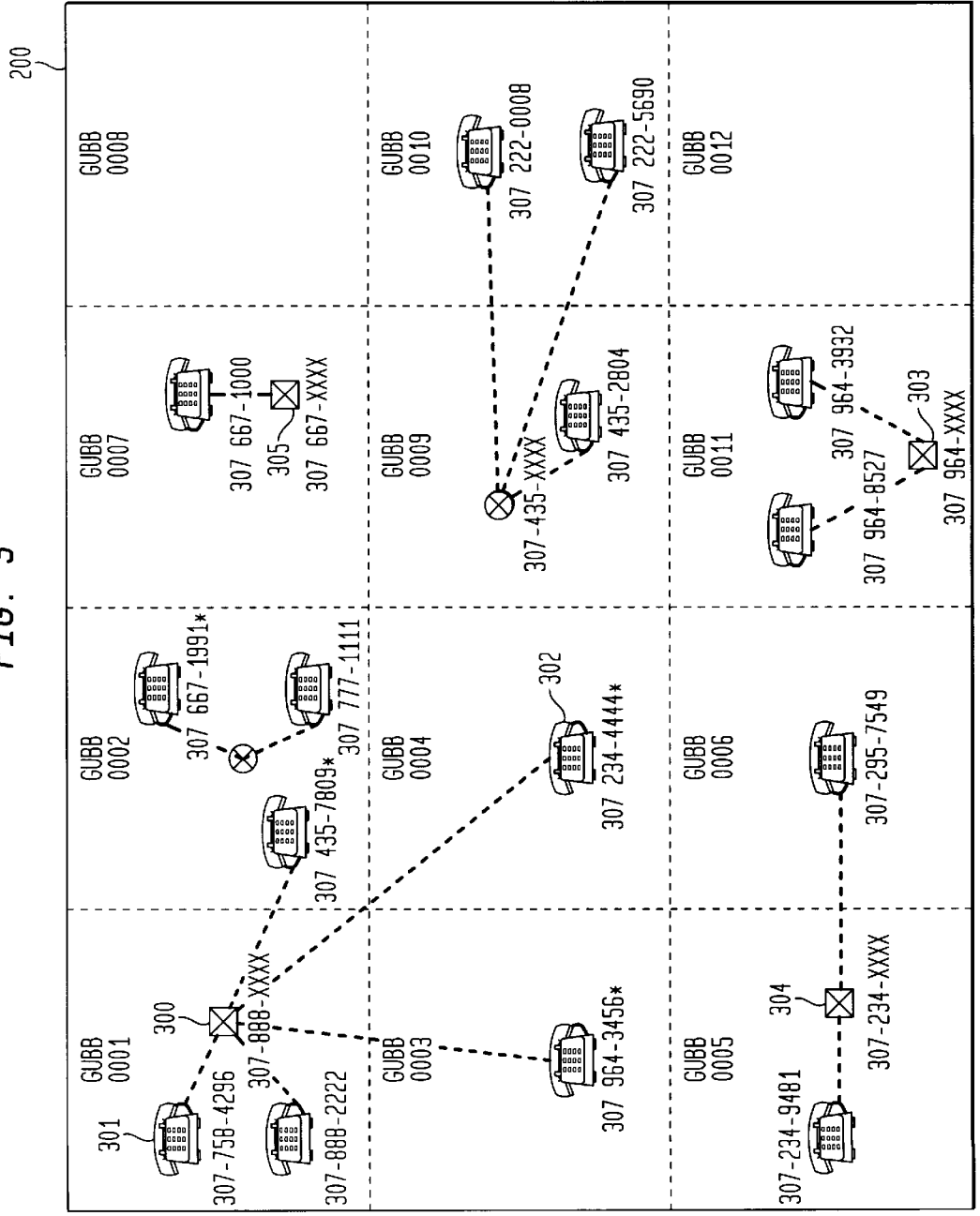
FIG. 3 illustrates an example of a telephone network overlaying Geographic Unit Building Blocks.

The following description of the preferred implementations of the present invention is only exemplary of the invention. The present invention is not limited to this implementation, but may be realized by other implementations.

The present invention can be implemented in a variety of telecommunication networks including, for example, a telephone network as depicted in the block diagram of FIG. 1. Such a telephone network includes a plurality of switches A,B, and C connected by switched telephone network (STN) 106. For the purposes of this description, these switches are designated as Originating switch A 102, Donor switch B 108, and Recipient switch C 112. Each switch supports numerous subscribers such as telephone service subscribers 100 and 110. In a typical call flow in such a network, subscriber 100 dials a destination telephone number corresponding to subscriber 110; for example, 201-576-6123. The Originating Switch A 102 determines the type of call (i.e., local or toll) and selects the appropriate transport carrier. In this example, the Originating Service Provider transports the call from Originating Switch A 102. Processing this call according to the LRN procedure, Originating Switch A 102 recognizes that 201-576 is a portable NPA-NXX. Consequently it launches a query to the LNP database at SCP 104. Because the number is ported, the SCP 104 returns an LRN that identifies Recipient Switch C 112. FIG. 1 depicts the prior art for Local Service Provider Portability in which the Originating Switch A 102 routes the call to Recipient Switch C without additional call processing. This works because the number is not ported outside the rate center. As a result, the type of call, selected carrier, and billing information determined by Originating Switch A 102 prior to launching the LNP query is still applicable. There is no option for the customer to port outside the rate center with Local Service Provider Portability.

Our invention enables Location Portability allowing customers to port outside rate centers while retaining their existing telephone numbers. The way this is accomplished is to substitute for the geographic aspect of the NPA-NXX a new geographic identifier. This identifier will pinpoint the geographic location of the customer without restricting the ability of the customer to retain their existing telephone number when they change physical location. In this manner, the geographic identifier, rather than the NPA-NXX of the dialed telephone number, is used to type the call as local or toll, to select the appropriate transport carrier, and to generate billing information.

In order to maintain the relationship between the called party and the called party's location, our invention introduces a concept we have called the Geographic Unit Building Blocks (GUBBs). A GUBB is defined as the smallest geographic unit within a State (or area of portability) used for purposes of identifying the geographic location of telephone subscribers. The boundaries of each GUBB shall be defined on a template (a map) specific to each State (or area of portability).

Our invention comprises using the GUBB identification as a four digit appendix to the LRN stored in the LNP database translation table. When a subscriber attempts to place a telephone call to a subscriber whose number is potentially ported, the local switch queries the LNP database which in turn uses the called telephone number to look up the LRN. If the called party is indeed ported, the LNP database returns the LRN to the local switch. If the called number is also ported outside the rate center, i.e., it is location ported, the LNP database also returns the GUBB which is appended to the LRN. The local switch uses the 10-digit LRN to route the call to the destination switch. Since the called number is ported outside the rate center, the local switch uses the GUBB portion of the LRN to type the call as local or toll and to select the appropriate transport carrier. Then, the local switch uses the remainder of the LRN (the NPA-NXX) to address the destination switch. In routing the call to the destination switch the called party telephone is forwarded along with the LRN and GUBB.

Each Geographic Unit Building Block (GUBB) is a separate, distinct area with specific non-overlapping borders. One or more GUBBs shall include all of the territory within the legal boundaries of a State (or defined area of portability). The State or area of portability template is defined for each State or area of portability by the regulatory commission with jurisdiction over that area of portability and/or by common agreement among all common carriers operating within the State or area of portability.

The definition of the GUBB template within a State or area of portability is static and need occur only one time. Changes to the boundaries of a GUBB should occur only when absolutely necessary because of the changes that would need to be reflected on the Local Number Portability database, the LRN-GUBB routing tables within every switch of every common carrier, and the billing systems of every distance-sensitive carrier. FIG. 2 illustrates an GUBB Template for a sample State X. The square 200 illustrates the geographic region of State X. Each subsquare GUBB (0001 . . . 0012) depicts an area of the State X 200 for which a GUBB has been assigned.

A carrier would assign a GUBB to all telephone numbers and NPA-NXXs for each of its subscribers. Every and all native NPA-NXXs on a switch shall have a native GUBB assignment so as to include the geographic location of its native numbers in the routing tables. FIG. 3 illustrate State X template 200 and the location of switches within the State 200. Switch 300 is located in GUBB 0001 and serves a subscriber 301 also located in GUBB 0001 while also serving a subscriber 302 in GUBB 0004. Subscriber 302 has a telephone number with an NPA-NNX of 307-234 which was ported from Switch 304.

In accordance with one embodiment of our invention, all ported numbers shall have an explicit GUBB assignment as part of the LRN on the Local Number Portability database. In addition, every telephone number working on a switch shall have a GUBB assignment. This is done by explicitly provisioning a GUBB against every working telephone number in a switch. This could also be accomplished by provisioning a default GUBB against native NPA-NXXs in a manner similar to what is done today to provision a LATA identification for each working telephone number. The default GUBB for a native NPA-NXX would apply to all telephone numbers in the NPA-NXX which do not have a GUBB explicitly provisioned, i.e., are not ported outside the rate center.

Switch processing will route the call based in part on the LNP SCP response which is still expected to be a 10 digit LRN. However, the last four digits of the LRN in a portable environment with rate center change will correspond to a Geographic Unit Building Block (GUBB). It is the GUBB, in combination with calling party information that enables the switch to type the call as local or toll, select an appropriate transport carrier, generate the proper billing information, and provide the appropriate toll warning. When numbers are ported outside rate centers, the switch must be able perform digit analysis based on the GUBB. It becomes possible to administer the post-query routing tables separately from any pre-query routing tables. This separation allows control over the type of call and allows digit analysis to be performed at the necessary level of granularity. In the prior art, the NPA-NXX of the dialed telephone number (or an explicitly dialed carrier code) was used in routing tables to type the call and select the appropriate carrier. Numbers can not be ported outside of rate centers because the switch could not use the NPA-NXX of such telephone numbers to type the call and select the proper transport carrier. Our invention allows such portability to occur by using the GUBB in routing tables rather than the NPA-NXX of ported telephone numbers. GUBB-based routing tables are necessary to route calls to telephone numbers that are ported outside the rate center. They may be used only for post-query processing of calls to ported telephone numbers. Alternatively, GUBB-based routing tables can be implemented for processing of calls to all telephone numbers, ported and non-ported, if the routing tables reflect default GUBBs. For example, although switches 303 and 305 in FIG. 3 do not have numbers that were ported in, they are still assigned a GUBB because GUBB is now the basis for rating.

For numbers ported outside rate centers, the originating switch performs carrier selection based in part on the analysis of the type of call defined for the GUBB in the routing tables. This type of call is used in conjunction with the calling party's presubscribed or dialed PIC1/PIC2 information, class of service, etc., to select the appropriate carrier for transport of a call to a ported number. This allows the current procedures for presubscription for primary Interexchange carriers, interexchange toll restrictions on incumbent local exchange carriers, and distance-based pricing to be supported when numbers are ported outside rate centers. It also enables the local public office dialing plans used for non-ported customers to remain unchanged.

The following carrier selection procedures can continue to be used:

For Call Type 1 (Intra-Network, Intra-Rate Center), the local service provider (serving the calling party) routes the call to the switch identified by the LRN.

For Call Type 2 (Inter-Network, Intra-Rate Center), the local service provider (serving the calling party) routes the call to a trunk group or tandem switch which interconnects with the local service provider that directly serves the called party.

For Call Type 3 (Inter-Rate Center, Intra-LATA), the following three scenarios apply:

If the local service provider (serving the calling party) also carries intralata toll calls for the calling party, then it routes the call to the switch identified by the LRN.

If a preferred intralata toll carrier carries intralata toll calls for the calling party, then the local service provider routes the call to a trunk group or tandem switch that interconnects with the carrier.

If 10(1)XXX(X) dialing applies to the call, then the local service provider routes the call to a trunk group or tandem switch that interconnects with the identified toll carrier.

For Call Type 4 (Inter-Rate Center, Inter-LATA), the following two scenarios apply:

If 10(1)XXX(X) dialing applies to the call, then the local service provider routes the call to a trunk group or tandem which interconnects with the identified toll carrier.

Otherwise, the local service provider routes the call to a trunk group or tandem which interconnects with the preferred interlata toll carrier.

Figures 4, 5:
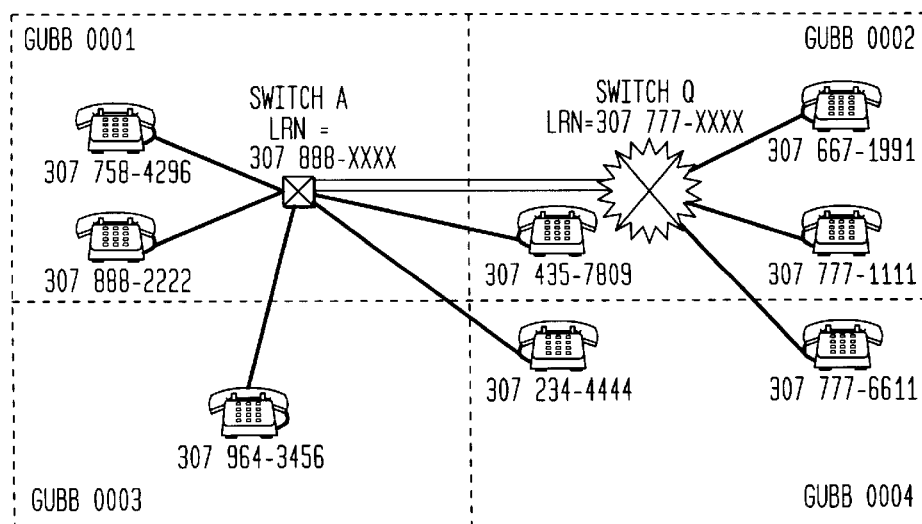
FIG. 4 depicts two exemplary routing cables.
FIG. 5. depicts an illustrative example of two service providers using our invention to achieve local number portability.

Table 1 as shown in FIG. 4 illustrates that each NPA-NXX native to each switch as depicted in FIG. 3 could be assigned an NPA-NXX-GUBB that can be used for internal routing purposes. In one embodiment of our invention the SCP 104 which completes all translations related to NP queries shall have the capability to:

populate the LRN of all "ported-in" numbers in the Local Number Portability database 104 with the LRN composed of the NPA-NXX assigned to the serving switch followed by the four digit GUBB of the telephone number assign a GUBB for all numbers working on the switch, native and ported, based on the geographic location of the telephone number as defined by the template. This assignment for non-ported NPA-NXXs can be made on an NPA-NXX basis or all working telephone numbers in that native switch. If all the telephone numbers are within one GUBB, then the GUBB can be assigned on an NPA-NXX basis, and obtain an assignment for, and ensure the publication of, a "home" GUBB for every native NPA-NXX.

The routing address for all ported numbers shall be the LRN, with the GUBB populated as the last four digits of the LRN. Table 2 as depicted in FIG. 4 illustrates the LNP Database LRN-GUBB assignments for the ported numbers shown in FIG. 3.

FIG. 5 illustrates a portability scenario where two different network providers are active in a state. The SquareNet Network provider and the StarNet Network provider both have LNP-capable switches and both are serving telephone numbers that are outside the normal assigned Rate Center for their NPA-NXXs. Rate Centers for Square Net Switch A are rate center 1 comprising GUBBs 0001/0003/0004 and rate center 2 comprising GUBB 0002. Rate Centers for StarNet Switch Q are rate center 1 comprising GUBBs 0002 and 0004, rate center 2 comprising GUBB 0001, and rate center 3 comprising GUBB 0003. As shown by the definitions above, the Rate Centers for the SquareNet and StarNet networks are different. The basic geographic area that the two networks handle, however, is the same, viz., GUBBs 0001 through 0004.

FIG. 6 depicts the routing tables created to implement LNP using GUBB in scenario illustrated in FIG. 5. Note that the SquareNet Switch is serving two Rate Centers. Consequently, two separate routing tables 601, 602, 603 are necessary for the proper routing of calls (same as today). The routing tables are oriented to an LRN-like structure, i.e., calls to native and/or non-portable NPA-NXXs have been converted to a 10-digit routing value using Table 601. As illustrated in the above example, each Local Service Provider (LSP) may use one GUBB or a combination of GUBBs to form their own rate centers. In our example, both the SquareNet and StarNet providers have defined their own Rate center boundaries. What these network providers did not define on their own, however, are the boundaries of the GUBBs. Both providers agreed on the GUBB boundaries and are thus able to carrier select, route, rate, and provide Toll Warning indications (if necessary) for calls from their end users. This illustrates the utility of the GUBBs and, at the same time, points out the necessity for:

compliance with the established GUBBs in the State accurate assignment of GUBBs to ported telephone numbers in the LNP database accurate population of LRN-GUBB routing tables in the switches themselves.

While there has been illustrated and described what are at present considered to be preferred embodiments and method of the present invention, it will be understood by those skilled in the art that various changes and modifications may be made, and equivalents may be substituted for elements thereof without departing from the true scope of the invention.

In addition, many modifications may be made to adapt a particular element, technique or implemention to the teachings of the present invention without departing from the central scope of the invention. Therefore, it is intended that his invention not be limited to the particular embodiments and methods disclosed herein, but that the invention include all embodiments falling within the scope of the appended claims.

What is claimed is:

1. A method for processing calls in a telephone network enabled to provide service and location number portability both within and outside a Rate Center, said method comprising the steps of:

accessing a pre-query routing database to rate a called party telephone number;

sending a query from an originating switch to a local number portability database requesting a location routing number wherein said query includes said called party telephone number;

finding in said local number portability database the location routing number associated with said called party telephone number;

sending a response from said local number portability database to said originating switch wherein said response includes said location routing number;

accessing a post-query routing database to rate said called party telephone number; and routing said telephone call to a destination switch based on said pre-query rating, on said post-query rating, and on said location routing number.

2. The method in accordance with claim 1 wherein said location routing number stored in said local number portability database is comprised of a six digit routing number, separate and distinct from a dialed NPA-NXX of the called party telephone number which identifies the geographic location of the destination switch; and, wherein said location routing number stored in said local number portability database is comprised of a four digit rating number, separate and distinct from said routing number and the dialed NPA-NXX, which identifies the geographic location of said called party.

3. The method in accordance with claim 2 wherein said pre-query rating is based on the dialed NPA-NXX.

4. The method in accordance with claim 2 wherein said post-query rating is based on said four digit rating number of said location routing number.

5. The method in accordance with claim 1, wherein said local number portability database includes a translation table comprising:

telephone numbers; and location routing numbers associated with each of said telephone numbers wherein said location routing numbers are comprised of a six digit routing number to locate the geographic location of a switch serving said telephone numbers and a four digit rating number appended to said six digit routing number to locate the geographic location of called parties associated with said telephone numbers.

6. The method in accordance with claim 5, wherein said local number portability database is resident in an end office switch.

7. The method in accordance with claim 5, wherein said local number portability database is resident in a service control point.

8. The method in accordance with claim 5, wherein said four digit rating number defines a specific sub-area of a geographic location.

9. The method in accordance with claim 5, wherein said four digit rating number is utilized for call rating purposes in place of the called party telephone number.

* * * * *